United States Patent [19]
Ricciardi et al.

[11] 3,890,414
[45] June 17, 1975

[54] RAPID COOLING PROCESS FOR IMPROVING QUALITY OF POLYURETHANE FOAM

[76] Inventors: Michael Anthony Ricciardi, 100 Woodlawn Dr., Conyngham, Pa. 18219; David J. Smudin, 849 Davidson Rd., Piscataway, N.J. 08854; Richard D. Wagner, 1007 Seybert St.; Michael Pcolinsky, 8½ E. Diamond Ave., both of Hazelton, Pa. 18201; John Edward Chaya, 638 North St., West Hazelton, Pa. 18201

[22] Filed: Mar. 19, 1973

[21] Appl. No.: 340,981

Related U.S. Application Data

[63] Continuation-in-part of Ser. No. 117,356, Feb. 22, 1971, abandoned.

[52] U.S. Cl. .................. 264/45.1; 264/45; 264/48; 264/45.5; 264/DIG. 11; 264/DIG. 12
[51] Int. Cl. ............................................ B29d 27/03
[58] Field of Search... 264/46, 48, DIG. 11, DIG. 12, 264/231, 93, 101, 237, 248, 45; 260/2.5 BD

[56] References Cited
UNITED STATES PATENTS

| | | | |
|---|---|---|---|
| 3,015,851 | 1/1962 | Wiles | 264/101 |
| 3,016,575 | 1/1962 | Edneth | 264/101 |
| 3,029,473 | 4/1962 | Greenberg | 264/101 |
| 3,061,885 | 11/1962 | Rogers | 264/321 |
| 3,086,248 | 4/1963 | Cullp | 264/101 |
| 3,112,524 | 12/1963 | Legler | 264/321 |
| 3,265,784 | 8/1966 | Jacobs | 264/237 |
| 3,269,882 | 8/1966 | Willy | 264/237 |
| 3,558,753 | 1/1971 | Edlin | 264/321 |

*Primary Examiner*—M. J. Welsh
*Attorney, Agent, or Firm*—James P. Scullin

[57] ABSTRACT

A process for improving the uniformity of the properties of a bun of polyurethane foam and for preparing foam having desired tailored properties is provided that comprises rapidly and uniformly cooling a bun of hot freshly polymerized foam by passing a large quantity of a cooling gas through the foam mass. Preferably, the gas is air that is drawn through the foam by applying a suction to one surface thereof.

17 Claims, 5 Drawing Figures

PATENTED JUN 17 1975　　　　　　3,890,414

SHEET　　2

RAPID COOLING PROCESS FOR IMPROVING QUALITY OF POLYURETHANE FOAM

This application is a continuation-in-part of our copending application Ser. No. 117,356, filed Feb. 22, 1971 now abandoned.

Cellular solid plastic polyurethane, generally known as urethane foams, have become extremely important for a wide range of uses. Generally, the flexible foams have been used for cushions, mattresses, sponges, rug underlays and similar uses. The more rigid foams have found uses as crash pads or for structural and insulation purposes. The foam is generally produced by the evolution of a gas in situ during the polymerization of liquid reagents. The evolved gas causes a foaming of the liquid reaction mixture which then hardens, or sets, as the polymer solidifies, to form the cellular solid "foam".

The polymerization reaction is highly exothermic. As a result, the cellular polymer is at temperatures of 300°F or greater. Subsequent to substantial completion of the polymerization and blowing reaction, i.e., where a stable solid has been formed, the cellular solid, or foam, produced has been permitted to slowly cool to room temperature, providing a post-blow, or postfoaming, "curing" period. It has generally been assumed that the slow cooling and curing was necessary in order to effect the desired degree of cure and to maintain the quality of the product by preventing the formation of irregularities or damaged areas in the foam. For example, it has been assumed that without the slow curing process there would be excessive and irregular contracting of the foamed mass, a collapsing of the cellular structure of the foam, cracking of the foamed product, thereby rendering at least the surface portion unuseable, embrittlement of the foamed structure, and a trapping of condensed liquid in the foamed structure; all of the above would have decreased the quality and the yield of desireable foam product, making the process uneconomical for commercial use.

The cure time was also considered to be necessary in order to permit the solid foam product to reach a stable condition as to structural properties and dimensions. Until the product is stable, it is believed that further processing to prepare manufactured products would be inefficient, if not useless, because the final properties and even dimensions of the product could not be predicted or stabilized until the cure period was complete.

Because of the difficulty of maintaining constant ambient conditions at all times, the curing conditions are not always consistent and the foamed products tend to have wide variances in properties, rendering it extremely difficult to tailor-make foam having, e.g., specific compressive strengths and indentation load deflection values. The maintenance of constant ambient conditions would have required the air-conditioning of extremely large factory areas where urethane polymers are produced. This is extremely difficult and expensive because of the evolution of gas or vapor from the polyurethane reaction masses which require the continuous venting of the factory area. Accordingly, it becomes uneconomical to maintain such air-conditioning to maintain uniform ambient conditions surrounding the curing foam. Some attempts have been made to accelerate the curing period. U.S. Pat. No. 3,061,885, for example, discloses a process for accelerating the cure by subjecting the hot foam to blasts of hot air at elevated pressures.

Generally, polyurethane foam is commercially prepared in large masses of foam as "slabs" or "buns", of rectangular or circular cross-section, which include cylindrical and block-shaped slabs, as well as, e.g. toroidal forms. These materials, generally, have a minimum cross-section dimension of at least about 14 inches and can be formed with a major dimension of about 5 feet or greater. Such slabs or buns, because of their great volume and the excellent heat insulating qualities of the polyurethane foam tend to cool slowly, the interior parts especially remaining at the high reaction temperature of 200°F or higher for many hours, or even days, before cooling to below the temperature at which the foam properties become substantially stable and the foam can be further processed, for example peeled into strips. Such interior portions of large cross-section slabs are subjected to a longer cure and thus have properties which are very much different from those of the rest of the foamed mass; the properties of the foam are then not uniform, sometimes varying in a gradient of properties between the outer surface material and the material at the center of the bun. Further, particular "hot spot" portions where the temperature remained very high, may be degraded or otherwise changed to an extent rendering them unfit for any use as a commercial product.

Accordingly when such large buns were processed and cut into small pieces for use in, for example, upholstery or cushions, it was necessary to check the entire lot of foam to insure that all portions of the foam had the desired range of properties. Portions of the foam that did not have the desired physical properties, e.g. firmness in resisting compression, for foam to be used for upholstery, would have to be discarded. Generally, the longer the period of cure before cooling, the greater is the firmness. Thus the portions of the block or bun of foam having the highest temperature for the longest period of time, i.e. the hot spots and areas in the center of the bun, will have a greater firmness than the surrounding material. It is accordingly important to take great care in eliminating foamed pieces which do not meet standards. This further increases the cost of the process by increasing the amount of labor necessary to fabricate a given piece of foam. In addition to degradation of the polymer per se, there is a possibility of the loss of certain of the more volatile additives from the interior of the slab. It had always been assumed, however, that these negative considerations were outweighed by the positive considerations of permitting the extended cooling and curing period.

Because the art considered the extended cure time so important, it did not consider omitting it, even though this improves the economy of the process. The cooling and curing time was the traditional bottleneck in the process from polymerization to final product.

It has now been discovered, that a most useful, high quality, open-celled foamed polyurethane product can be prepared having tailored, uniformly desirable physical properties by a process wherein the foam is cooled at a rapid rate, beginning at a predetermined time after the preparation of the foam, by passing a large volume of a cooling fluid through the hot, newly prepared foamed product to evenly cool the foam throughout. The foam is rapidly cooled to a temperature at which it will remain dimensionally and structurally stable and at which it can be readily processed, thus relieving the further bottleneck. The present invention generally comprises the process of preparing a foamed polyurethane polymer mass at elevated temperatures under foaming conditions until the polymerization reaction has produced a stable solid polymer having desired properties, and quickly quenching the reaction by passing a large volume of cooling fluid into and through the foamed product to cool the product quickly and evenly. Although a wide range of reactants can be used to prepare polyurethane foam, the most common reaction is that of di- or polyfunctional hydroxyl compounds, such as hydroxy-terminated polyethers or polyesters, with di- or polyfunctional isocyanates, usually in the presence of water.

Generally, this process is most effective with the large commercial buns, where the problem of interior cooling is greatest.

It is generally preferred that the cellular polyurethane foam used in this process have a substantially open construction. Generally, at least about 30 percent of the cells should be interconnected and communicate with the exterior of the foam mass; optimally at least 70 percent, to over 90 percent, or even 100 percent, of the cells should so communicate.

Most unexpectedly, the present process results in a product having the desirable properties of polyurethane foam in a far shorter time than was previously thought possible. In fact, in many cases foam of superior properties can be obtained; just as important, the properties of the final product can thus be tailored by quenching the reaction after a preselected period of curing, thus permitting the preparation of foams having a range of properties from a given reaction formulation. Generally, when utilizing a specific reaction formulation for the preparation of the foam, the longer the foam is permitted to cure after production is begun the greater the product strength; for example, the greater is the resistance to indentation or "firmness", of the foam. Therefore, a desired firmness can be obtained by beginning the cooling after a certain time. The time when the cooling flow of fluid should be applied can be determined by prior tests of that foam formulation, or by testing the hot foam while it is curing, until the desired firmness is reached.

This quick cooling also gives the additional advantage of providing a slab or bun of polyurethane foam wherein the physical properties of the polyurethane are substantially uniform throughout, as well as being predictable. This is possible because the entire mass of foam is cooled so quickly that the entire mass cures for substantially the same period. Furthermore the properties and dimensions of the foam remain substantially constant once the forced cooling is completed, contrary to prior experience which required waiting at least 24 hours or even longer before a bun was sufficiently stabilized that it could be processed further.

Contrary to what would have been expected, the rapid cooling of the bulk of the foamed product does not result in any cracking at the surface or in the interior of the mass or in any collapse of the cell structure. The quick cooling, in fact, minimizes certain undesirable heat-induced side reactions which cause deterioration of the foam. Such reactions include cleavage of the polyester spine by amino groups, air-induced oxidative degradations of e.g. polyols, aromatic amines and colorants. Further, certain useful additives present with the polyurethane are adversely affected by long term heat, such as certain commonly used flame retardants, e.g. tris(2,3-dibromopropyl) phosphate. Perhaps even more significantly, the rapid cooling greatly simplifies and makes more precise the tailoring of properties for the final product: the cooling is accomplished quickly and uniformly after the foamed product has attained the desired properties. Ambient conditions have substantially no effect upon the properties of the foamed product because of the rapidity of cooling. Generally, cooling substantially to room temperature is completed within 1 to 40 minutes after rapid cooling is initiated and preferably from 2 to 10 minutes is sufficient after rapid cooling is initiated.

The rapid cooling should be initiated from 15 minutes to 240 minutes after production and preferably from between 30 minutes and 120 minutes after production. This avoids having the outer portion of the slab, near the surface, cool down while the inner portions remain hot for a substantial period of time.

The time measured after "production" of the foam refers to the time after which the reactants begin to polymerize and foam, i.e. after the reagents and catalysts are mixed and the foaming and polymerization reaction is initiated.

In its broadest scope, the process comprises passing a cooling fluid through a hot, freshly prepared, foam by inducing a fluid pressure drop across at least two opposing fluid-permeable surfaces of the foam. The pressure drop can be induced either by reducing the pressure above one of the surfaces, or by applying a positive fluid pressure to one of the surfaces. If desired, both can be done simultaneously: a positive pressure can be applied to one surface and the pressure on the other surface reduced by using a recycle system comprising two manifolds each in contact with an opposing foam surface, a conduit connecting the manifolds through a port in each, and a pump in the conduit for circulating fluid through the system.

The preferred procedure for cooling comprises applying a reduced pressure to at least one surface, or to a portion of the surface, of the foamed solid product and exposing a second opposing portion of the surface of the foamed product to atmospheric pressure, thereby causing a gas to be drawn in through the second portion of the surface of the foam and pass through the bulk of the foamed product, exhausting through the first portion of the surface. Most preferably, the cooling gas is caused to pass through the entire mass of the foamed product, i.e. the line of fluid flow passes through the center line of the foamed mass. This insures that the cooling gas will penetrate to the innermost portions of the foamed slab, which would otherwise tend to remain at the high temperature for the longest time because of the insulating properties of the foamed polyurethane.

Generally, air is a satisfactory cooling fluid. There is only a slight chance of carbonization occurring during the short period the air is blown through the foam at the elevated temperatures because the foam is cooled so rapidly. This makes it usually unnecessary to utilize an inert gas, such as, for example, nitrogen, carbon dioxide, any of the rare gases such as argon, helium, neon, krypton and xenon, or one of the halogenated hydrocarbons. However, if desired, or where needed for special foams, an inert cooling fluid can be used. Mixtures of gases can also be used, such as, for example, mixtures of air and nitrogen, or air and carbon dioxide. The cooling gas can be supplied to the inlet side of the apparatus by any convenient means, including, for example, discharge from a cylinder of compressed or liquified gas, or by vaporization of dry ice.

The application of a reduced pressure to draw ambient air, nitrogen, or other gas through the foamed product is preferred because it permits the greatest degree of control over the procedure. Generally, polyurethane foams tend to retain a certain amount of noxious vapor or volatile material, or vaporized liquids, in the foamed cellular structure, including cyanic acid, hydrogen chloride and various lower molecular weight amines and lower molecular weight urethanes and isocyanates. Noxious vapors or atomized liquids are withdrawn from the foam by the cooling fluid flow. These can be readily collected in the exhaust system used to apply a reduced pressure to one surface of the foam. Thus the additional benefit is obtained of preventing the dispersion of noxious material into the factory area and beyond. The process thus not only permits the greater control of the properties of the foam, but also results in a decrease in environmental pollution.

Generally, in carrying out the cooling process of the present invention, the temperature of the foam should be lowered to at least 150°F, and preferably to at least 120°F. Such temperatures are sufficiently low to substantially reduce the number of detrimental side reactions which can occur at the higher temperatures to which the polyurethane may be subjected. However, even at 120°F certain undesirable reactions can occur, resulting in a change in physical properties, especially in the interior portions of the bun. It is for this reason that it is preferred to bring the temperature down to substantially room temperature, or at least to about 80°F before halting the passage of cooling fluid. If the bun were to immediately processed after cooling, e.g. peeling, it would be necessary to cool it to substantially room temperature in order to stabilize the properties and dimensions immediately. However, if the bun were first to be stored before further processing, it would not need to be cooled as much. The temperature of the cooling fluid should be about 80°F, or lower, before passage through the foam. Temperatures of 40°F, 0°F, or even substantially lower can be employed. The precise temperature of the cooling fluid is not critical, as long as it is at least as low as about 80°F: lower temperatures are advantageous in shortening the time required to bring the foam down to the desired temperature.

When the ambient temperature is sufficiently low, approximately 80°F or less, air from the surrounding atmosphere is a satisfactory cooling fluid. During hot weather, when the ambient temperature is above about 80°F, air or other gas cooled by an air-conditioner or other refrigerating means can be employed. During winter months, if it is desired to use a temperature lower than that of the ambient temperature inside a factory, outside air drawn through a pipe or duct can be used as a cooling fluid.

Rapid cooling is begun by the passage of the coolant fluids through the foam. Generally, the time required for cooling is dependent upon the following variables;
1. The temperature of the foam prior to initiation of cooling.
2. The temperature of the cooling fluid.
3. The cell size of the foam.
4. The openness, or degree of porosity, of the cellular foam.
5. The flow rate (SCFM) of the coolant fluid passing through the foam per unit volume of foam.
6. The heat capacity of the coolant fluid.
7. The proportion of the total foam mass through which the coolant is passed.

When operating the reduced pressure type of system, where ambient air is drawn through the foam, the temperature of the cooling medium will be air at about 75°–80°F; the coolant flow rate through the polymer mass is directly related to the pressure drop developed, i.e. the manifold pressure induced by the vacuum means, for any given piece of foam; the heat capacity of the coolant will be the heat capacity of air; and, the proportion of the foam through which the air passes will be determined by the size of the manifold relative to the total surface area of the foam to which the manifold is applied and the portion of the opposing side of the bun which is exposed to the atmosphere, and the relative position of the two surfaces.

When applying reduced pressure to one surface of a foam bun, the pressure is generally reduced by at least about 4 psi below ambient. With certain foams, it is possible to avoid the trimming steps by applying a very low pressure for a short time at the beginning of the cooling period, which can tear the impermeable densified skin formed on the foam during polymerization and also increase the degree of pore openness, as described in German Pat. No. 1,128,124. Once the skin is removed, air is sucked into the manifold through the foam mass.

The cellular polyurethane foams that are employed in the practice of this invention can be any open-celled polyurethane foam available to one skilled in the art. The most generally available polyurethane foams include the polyester and polyether polyurethane foams. However, all other open types of foam, such as the foams prepared from the reaction of an organic diamine with a bishaloformate of a glycol or of a polyalkylene ether glycol, such as is described in U.S. Pat. No. 2,929,802 issued Mar. 22, 1960 to Katz, generally with an added blowing agent, can be treated equally well. Although preferably the foams useful with the present invention are of the more common open-type flexible foams, resilient, rigid and semi-rigid polyurethane foams can also be cooled according to the present process, if the foam structure is sufficiently open, i.e. at least about 30 percent open; for example, see Japanese Pat. Nos. 68/17592 and 68/08839. Cold molding and integral skin type of foam can be cooled by this process also.

Generally, cellular polyurethanes are derived from the reaction of an organic polyisocyanate with an organic compound having active hydrogen atoms and especially hydroxy-terminated organic polyesters or polyethers having at least two available isocyanate-reactive hydroxyl groups per molecule. The polymerization reactions are generally carried out in the presence of a blowing agent, which is needed if the amount of carbon dioxide evolved by the polymerization reaction is insufficient to give the desired low density foam. Blowing agents include, e.g. water or inert gas. A catalyst is also generally necessary, as are cell modifiers, cell stabilizers, gas formers, colorants, plasticizers, fillers and the like. These are all well-known to the art and form no part of this invention.

The accompanying drawings describe more particularly specific embodiments of apparatus useful in carrying out the process of the present invention.

Figure 1:
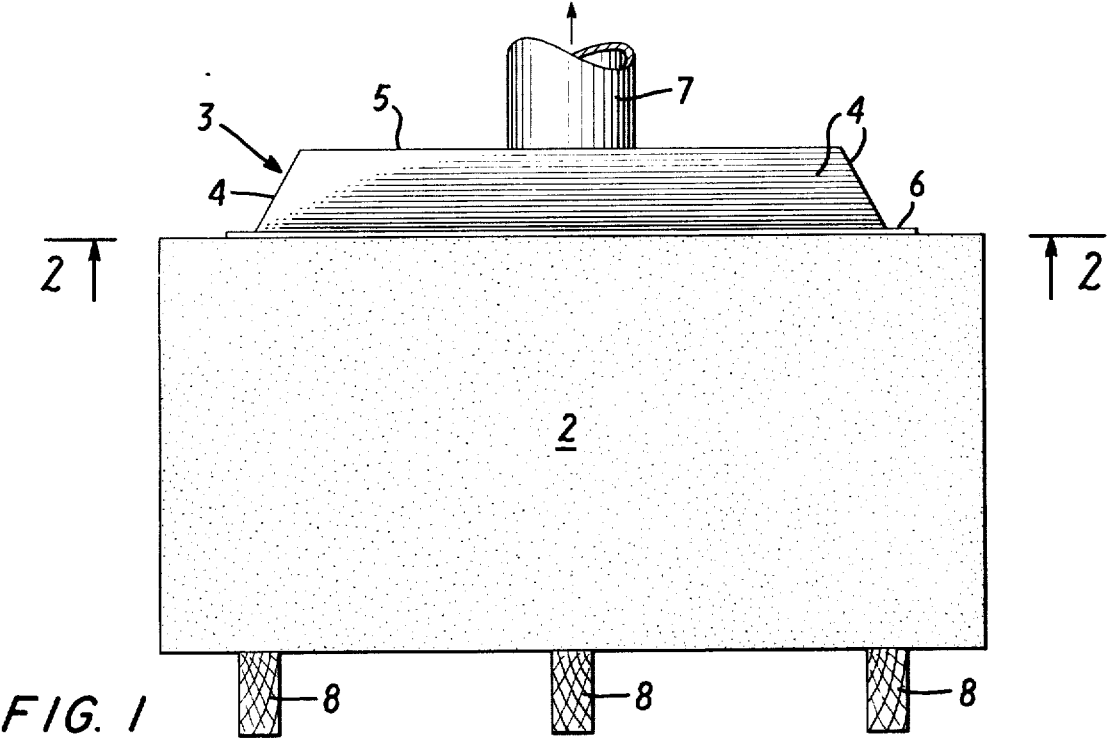
FIG. 1 is a front elevation view of one type of apparatus useful in the carrying out of the present invention by applying a reduced pressure.
Figure 2:
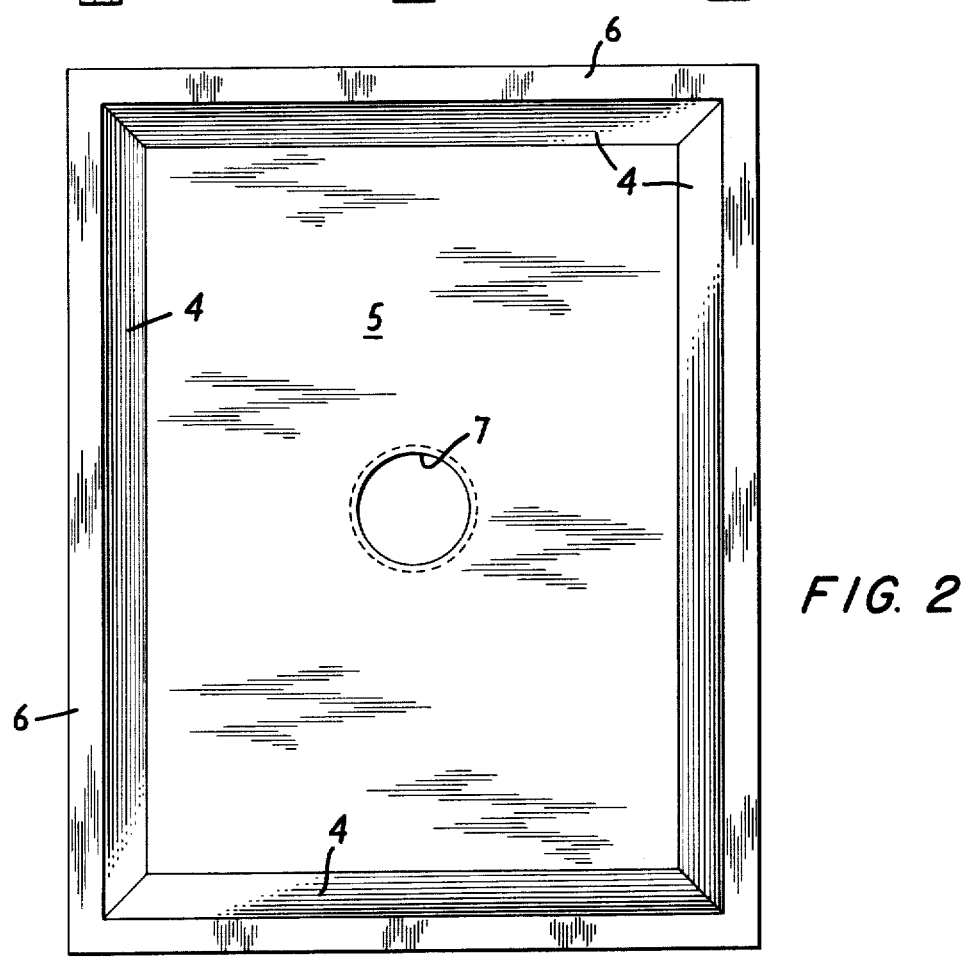
FIG. 2 is a bottom view of the cooling fluid manifold portion of the apparatus of FIG. 1, taken along lines 2—2.

Referring to the apparatus of FIGS. 1 and 2, a large polyurethane foam slab 2, in this case a block-shaped slab, is supported above the ground upon three rails 8. On the top surface of the block rests a manifold 3, the interior of which is shown more particularly in FIG. 2. The manifold comprises a flanged open-sided box having slanting side walls 4, top wall 5, and flanges 6, which are generally parallel to the upper surface 5 and which are intended to fit flush against and form a seal with the squared-off top surface of the foamed polyurethane slab 2. Exhaust duct 7 is formed in the top wall 5 connecting the manifold to a vacuum-producing, i.e. pressure-reducing, fluid exhaust means, not shown, such as the intake end of a pump, an exhaust fan, or a blower. The foamed block 2 is raised above the floor on rails 8 so as to permit air to flow to the under surface of the block and then into the interior of the block.

In operation, when the vacuum-producing means is turned on, a reduced pressure is formed in the interior portion of the manifold, causing air to be withdrawn from the cellular structure of the polyurethane foam block. Air is thus drawn into the interior of the foam through the outer walls as the pressure within the cellular structure decreases. Air is therefore passed from one side of the slab, through the center of the polyurethane foam block and is exhausted through the other side through the manifold. The air withdrawn from the manifold can be passed through a scrubber to remove any noxious vapors that may have been swept out from the foamed block prior to releasing the air to the atmosphere.

When it is desired to use an inert gas such as nitrogen or carbon dioxide as the cooling fluid, or air at a temperature below that of the amibient temperature, one convenient method of achieving it is to employ two of the manifolds 3. In this case, the polyurethane foam slab 2 is supported on the second manifold, and the cooling fluid is supplied from any convenient source through the duct 7 in the second manifold. Other means of supplying the inert gas or cold air to a surface of the foam can also be employed without departing from the scope of the present invention.

Polyurethane, when formed into a bun or slab is formed with a skin, i.e. a generally densified substantially non-porous outer layer of polymer which must be removed or punctured before fluid can be flowed through. It is often necessary to remove a thin layer, e.g. often from about one-eighth inch or less to about 1-inch thick, from a pair of outer opposing surfaces of the foamed block. This exposes a fresh porous surface and permits the passage of fluid into and through the foamed block.

Figure 3:
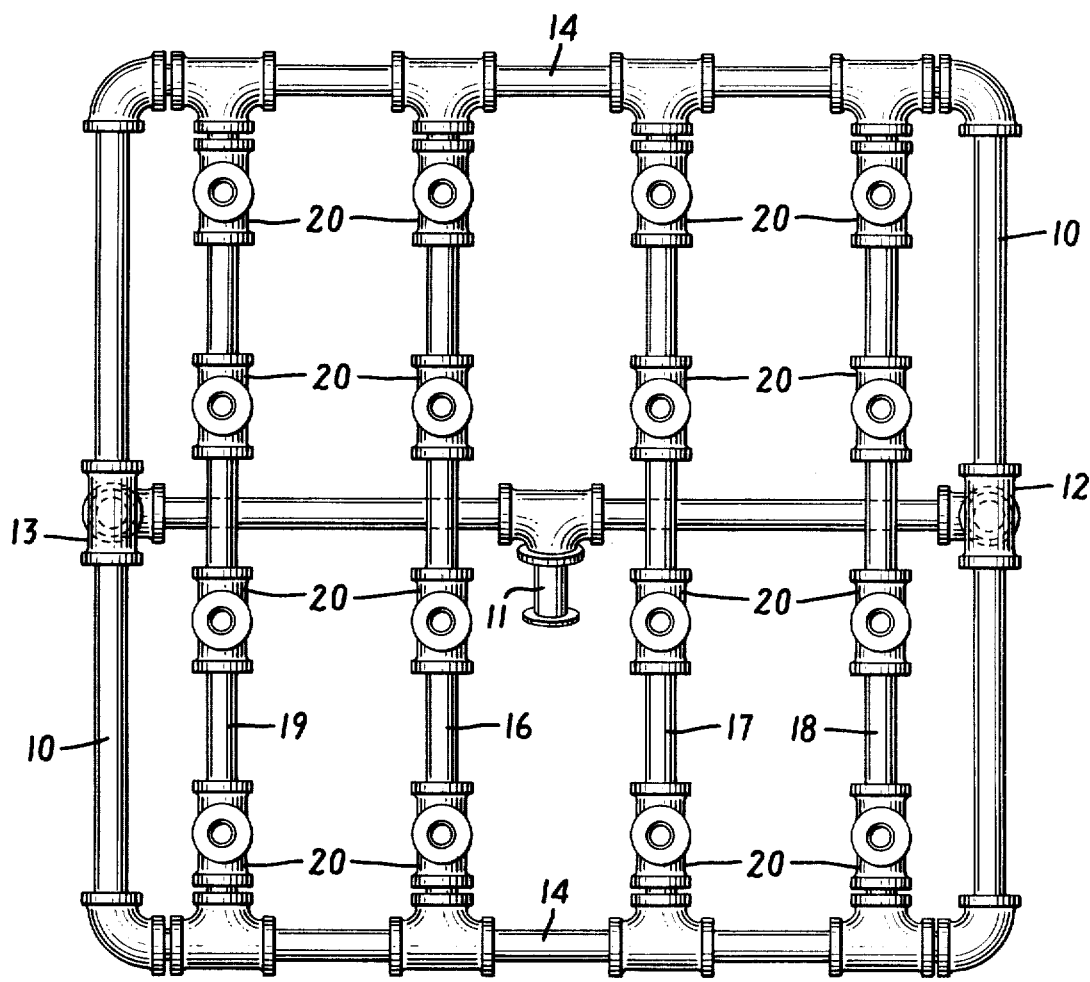
FIG. 3 is a front view of another type of manifold useful for the application of high pressure cooling fluid to a foamed bun.

Referring to FIG. 3, a pipe frame work is depicted suitable for injecting high pressure fluid, such as air, nitrogen or carbon dioxide, into one surface of a polyurethane foam bun to force gas through the bun and blow the gas out the other side. The manifold comprises a network of pipes all interconnected to a manifold pipe 11. The manifold pipe 11 is connected by T-joints 12 and 13 to the distributor pipes 10 and 14 which in turn connect to cross pipes 16, 17, 18 and 19. Four T-joints 20 are connected in-line in each of the cross pipes 16, 17, 18 and 19 and the open end of each T-joint 20 has threaded into it an open, hollow metal needle capable of puncturing the outer surface of a polyurethane foam bun and open to pass fluid thereinto. All of the T-joints are oriented so that the needles point in the same direction.

Figure 4:
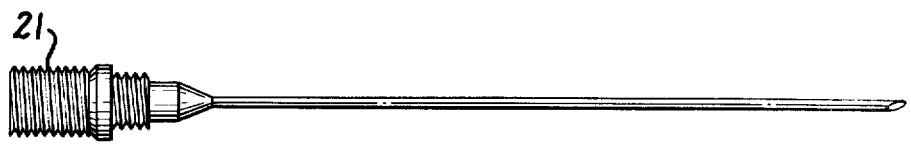
FIG. 4 is a side view of a fluid injection orifice useful with the manifold of FIG. 3.

FIG. 4 is a side view of a needle useful in the manifold of FIG. 3, showing the threaded adapter 21 designed and adapted to be screwed into the center opening of the T-joints 20. The design of the manifold of FIG. 3 is such that pressurized fluid entering the main pipe 11 is distributed equally among the needle orifices to exit as a fine stream from each needle into the body of a foam into which the needles are embedded. The positive pressure system of FIGS. 3 and 4 will therefore be preferably utilized when the pull of an exhaust pump is insufficient to create sufficient flow through a bun, as for a very thick bun, or when air cannot serve as the cooling medium and an inert gas or liquid is desirably used.

Figure 5:
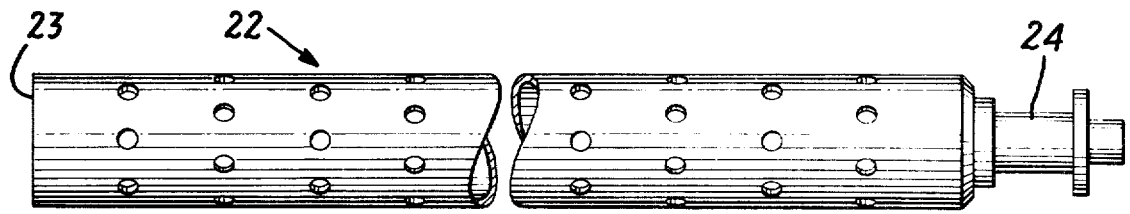
FIG. 5 is a side view of a cylindrical manifold useful for the passing of fluid to or from an interior portion of a foamed bun from or to the exterior surface.

The manifold device shown in FIG. 5 can be utilized for both the application of a vacuum and for the application of high pressure fluid to a foam bun being treated by the process of the present invention. The manifold comprises a generally cylindrical pipe, indicated generally as 20, having holes through the circumferential wall thereof communicating with the interior portion of the pipe. The pipe is capped by a solid plate 23 at one end and has attached thereto at the other end a coupling 24 designed and adapted to be connected to a source of high pressure fluid or to a fluid exhaust, or vacuum-producing means, such as the intake end of a fan or pump. The manifold of FIG. 5 is designed and adapted to be inserted into the interior of a foam bun and to draw air or push air through from the middle outwardly. This type of manifold is especially useful when dealing with generally cylindrical type buns such as those produced according to the processes disclosed in U.S. Pat. Nos. 3,281,894; 3,296,658; and 3,476,845, all to Buff et al and U.S. Pat. No. 3,488,800 to Kornylak.

In carrying out the process of this invention, the amount of fluid flow must be sufficient to cool the foam within the desired time. When utilizing a gas as the coolant fluid, whether drawing through air or blowing gas from a high pressure source, the gas flow can be as little as 1.3 SCFM per cubic foot of foam mass, and preferably at least about 10 SCFM per cubic foot of foam. Generally, the thicker the foam bun the greater the amount of coolant gas required to cool the bun per unit volume. Although there is no definite maximum fluid flow, the force of the flow should not be great enough to fracture the structure of the foam.

When preparing a bun of flexible foam according to the process of this invention, the structural physical properties of the foam can be determined to a degree greater than previously thought possible. It was difficult to tailor properties, heretofore, because of the unpredictable change in properties of the foam occurring during cooling; this was at least in part due to the lack of control over the rate and manner of cooling because of changes in the ambient. However, when utilizing forced cooling the mass of the bun cools so quickly, that, in effect, any change in properties can be halted at almost any point after production to prepare a foam having desired properties. Because the bun is cooled throughout its mass so quickly, the properties throughout the bun remain substantially uniform and unchanged from when cooling began.

The properties of the hot bun can be determined at any time after the polymer has formed as a stable cellular solid. The most significant properties for foam are density and indentation load deflection, a measure of firmness. When the properties are almost at the desired level, rapid cooling is initiated; the properties can be substantially set at that value. All of the properties are determined, in the following examples, according to the standard procedure set forth in ASTM D 1564–59T, (Revised, 1959).

The following examples all illustrate certain preferred embodiments of the present invention but are not intended to in any way limit the scope of the present invention.

EXAMPLE 1

A cellular polyurethane bun measuring 15 by 15 by 15 inches was prepared from a polyester polyurethane. The foam product had a density of about 1.5 pounds per cubic foot and a cellular structure having from 45 to 50 pores per linear inch, of which greater than 90 percent of the cells were inter-connected. Slices, one-half inch thick, were removed from the outer surfaces of each of the six sides, exposing fresh porous surfaces. The foam bun was laid upon three wooden tracks and a manifold, of the type shown in FIGS. 1 and 2, was placed on the upper surface of the foam block in the position illustrated in FIG. 1; the manifold; on its lower open side, was approximately 14 by 14 inches, with a ½-inch flange all around, thereby leaving a ½-inch space around the outer edge of the manifold to which vacuum was not applied. The manifold was pressed against the foam block so as to form a tight seal between the flange and top surface of the foam bun, thus preventing the passage of air between the bottom edge of the manifold and the top surface of the foam. The manifold pressure was 2.23 psia, such that 95 cubic feet per minute of air passed through the foam block and was exhausted through the exhaust duct 7. The initial temperature of the foam block when the vacuum was applied was 255°F, and it was cooled to ambient temperature of about 75°F in about 6 minutes, beginning 90 minutes after production. The bun had substantially uniform indentation load deflection values throughout its mass, and the value was substantially that of the bun at the time cooling was initiated.

EXAMPLE 2

Two, generally rectangular cross-section, foamed cast buns, 36 by 36 by 27 inches, formed of a polyether-type flexible polyurethane prepared from a polyether polyol (mol. wt. of 3000) and toluene diisocyanate, having a TDI index of 108, and water, plus an additional blowing agent, Freon.

One of the buns was cooled in the same manner as described above for Example 1 from a temperature of 275°F to 75°F in 3 minutes. The cooling was initiated, 87 minutes after production, by the application of a vacuum of 3.8 mm Hg pressure in the manifold, which drew 400 standard cubic feet of air per minute through the bun. The ILD was determined 30 minutes after the bun had been cooled to room temperature and again 24 hours after cooling. The second bun, indicated as Comparative Example A, in Table I below was permitted to cool at room temperature and required approximately 24 hours for cooling the entire mass to room temperature. The density of each bun is indicated and the indentation load deflection values on samples 12 inches square and 2 inches thick were determined for 25 percent, 50 percent and 65 percent deflection, respectively. The number after the (±) indicates the variation in values on samples taken from various portions between the top and bottom surfaces of the bun. The density of the foam is also set forth in Table I.

TABLE I

| Foam Number | Comparative Example A | Example 2 | |
| --- | --- | --- | --- |
| | | 30 Min. After Cooling | 24 Hr. After Cooling |
| Density (lbs/ft$^3$) | 1.29 ± 0.03 | 1.24 ± 0.02 | 1.24 ± 0.01 |
| Indentation Load Deflection on 2" | | | |
| 25 | 18.2 ± 2.1 | 17.9 ± 1.3 | 18.6 ± 1.3 |
| 50 | 24.2 ± 2.5 | 23.3 ± 1.4 | 24.2 ± 1.6 |
| 65 | 33.8 ± 3.8 | 32.4 ± 2.4 | 33.8 ± 2.7 |

As shown, the variation in indentation load deflection and density through the bun is much greater for the naturally cooled bun than for the forced cooled bun showing at least one of the advantages inherent in the present invention.

In addition, the forced cooled bun reached substantially stable density and ILD values within 30 minutes after cooling, or a total of about two hours after production. This forced cooled product, therefore, could have been immediately processed further. The comparative example required 24 hours to cool down and reach steady state properties, before it could be processed further.

EXAMPLE 3

A foamable polyurethane composition was prepared from a polyether polyol and toluene diisocyanate and water, without additional blowing agent, in the presence of amine and tin catalysts.

A series of 15 open-celled flexible foam buns, each having dimensions of 15 by 15 by 15 inches, was prepared from the above formulation by pouring the formulation into molds measuring approximately 16 inches on each side. The outer densified layer of each surface was sliced off to expose a freshly cut air-porous surface. Three buns were each subjected to forced cooling at either 30, 60, 90, 120 or 180 minutes after production. The forced cooling was accomplished utilizing compressed air at 40 psi, and a relative humidity of 45 percent as a coolant. The coolant gas flow was introduced into the bun samples via a cooling manifold having the general structure shown in FIG. 3, utilizing needle-like nozzles as shown in FIG. 4.

In the foam tested herein, more than 90 percent of the cells were interconnected.

The parallel cross-tubes 16, 17 and 18 and 19 were each ⅝-inch pipes into which had been placed, at approximately 1½-inch intervals, a series of T-joints. The needles extended 3-inches beyond the threaded adapter which was screwed into the open end of each T-joint 20. One side surface of each bun was pressed against the needles, causing the needles to penetrate its surface. Cooling air was blown through the needle openings into and through the bun and exhausted into the atmosphere.

Table II below shows the group average indentation load deflection (ILD) values for each group of buns, 30 minutes and 24 hours after cooling. The actual results of the tests of the three buns in each group did not vary by more than approximately 5 percent.

As shown, the value of the indentation load deflection gradually increased with time after production before cooling was initiated showing that the desired ILD could be tailored from a particular composition by initiating cooling a measured interval after production. Accordingly, it now becomes possible, by utilizing the process of this invention, to prepare foam having a desired ILD from a foamable composition suitable for preparing foam having a range of possible ILD's by initiating cooling at a predetermined period after production. Further, the ILD values of the foam were substantially set within one-half hour after cooling to room temperature, so that further processing could commence almost immediately.

EXAMPLE 4

A continuous slab of polyether polyurethane foam was prepared utilizing commercial foam-making equipment from a mixture having the following composition:

| Component | Parts by Weight |
|---|---|
| Polyether Polyol (3000 M.W. OH No. = 56) | 100.00 |
| Tin catalyst | 0.35 |
| Silicon Oil | 1.50 |

-Continued

| Component | Parts by Weight |
|---|---|
| Triethylene diamine | 0.10 |
| Fluorocarbon blowing agent | 7.00 |
| Water | 3.70 |
| Toluene Diisocyanate (80:20/2,4; 2,6 isomers) | 48.00 |
| Isocyanate Index | 108 |
| Cream Time (sec.) | 5.00 |
| Rise Time (sec.) | 90 |

Thirty minutes after production, (moment of pour) a piece of the foam slab was cut from the continuous slab production line and the top and bottom skins, or densified impermeable surfaces, were removed by taking a ¾-inch thick slice from each of the top and bottom surfaces. The dimensions of the hot block, after the slices were removed, were found to be about 76 by 49 by 28 inches. Forty-three minutes after production, (the internal temperature of the slab was measured to be about 295°F), cooling was initiated utilizing the equipment and manifold shown generally in FIG. 1 according to procedure of Example 1.

The manifold, in this case, had a lower opening measuring 42 by 54 inches. The exhaust pipe 7 leading to the vacuum producing device had a diameter of 2¼ inches and the vacuum was obtained utilizing a low pressure exhaust fan. The manifold pressure was 27 inches $H_2O$ and the quantity of ambient air passing through the bun, as measured in the exhaust pipe 7, was approximately 560 SCFM. The time required to lower the internal temperature of the bun from 295°F to 75°F (room temperature) was approximately 5 minutes. Examination of the block after cooling revealed no hot spots, indicating that the temperature had been uniformly reduced throughout the mass of the slab.

The physical properties of the bun were determined about 30 minutes after cooling, and again 24 hours after cooling; the results are shown in Table III. There was substantially little or no change in the 25 percent, 50 percent and 65 percent indentation load deflection on 2 inches thick samples removed from the top, middle and bottom portions of the block.

TABLE II

| Foam No. | Time After Production to Start of Cooling (Min.) | Time Required for Cooling (Min.) | Temp. at Cooling Initiation | 25% ILD on 2" 30 Minutes After Cooling Lbs. | 25% ILD on 2" 24 Hrs. After Cooling Lbs. |
|---|---|---|---|---|---|
| 3-A | 30 | 14 | 265 | 29.8 | 29.9 |
| 3-B | 60 | 16 | 245 | 30.4 | 30.8 |
| 3-C | 90 | 10 | 190 | 31.7 | 31.5 |
| 3-D | 120 | 10 | 155 | 32.5 | 32.0 |
| 3-E | 180 | 10 | 120 | 34.3 | 32.8 |

TABLE III

| | Initial (30 minutes) after cooling) | Final (24 hours) after cooling) |
|---|---|---|
| Density (lbs./ft³) | 1.27 | 1.29 |
| ILD on 2" (lbs.) | | |
| 25% | 15.2 | 15.8 |
| 50% | 21.0 | 21.6 |
| 65% | 29.1 | 30.2 |
| Tensile Strength (lbs./in.²) | 14.0 | 14.2 |

EXAMPLE 5

A bun or slab of polyether polyurethane foam was prepared according to Example 4, except that ¾ inch slices were removed from both sides of the bun as well as from the top and bottom surfaces, such that all six sides of the bun were completely trimmed to expose air-permeable surfaces. The block dimensions were approximately the same as before, 76 by 55 by 28 inches.

At 98 minutes after production the internal temperature of the block was found to be about 275°F and cooling was initiated in the same manner. The manifold pressure was approximately 27 in. H₂O, and the flow rate of air through the exhaust pipe was about 560 standard cubic feet per minute. The temperature was lowered from 275°F to room temperature in approximately 4 minutes. The ILD and density values of the cooled slab of foam are set forth in Table IV below. The same cooling apparatus was used as in Example 4.

As shown in this example, the removal of the additional portions of the slab surface increased the rate at which cooling occurred, but the same overall results were obtained, except that the ILD was consistently greater because of the additional period after production at which cooling was initiated compared to Example 4.

EXAMPLE 6

A polyester polyurethane foam was prepared in a generally cylindrical continuous block in accordance with the teachings of U.S. Pat. No. 3,281,894 to Buff et al.. The foam was prepared from a mixture having the following composition:

TABLE IV

|  | Initial (30 minutes after cooling) | Final (24 hours after cooling) |
|---|---|---|
| Density (lbs/ft.$^3$) | 1.32 | 1.28 |
| ILD on 2" (lbs.) |  |  |
| 25% | 17.6 | 17.5 |
| 50% | 23.7 | 23.5 |
| 65% | 33.0 | 33.0 |

| Component | Parts by Weight |
|---|---|
| Polyester Polyol (diethylene glycol-adipate, OH No. = 52) | 100.00 |
| Silicone Oil | 1.0 |
| Amine Catalyst | 1.9 |
| Isocyanate Index | 105 |
| Water | 3.6 |
| Toluene Diisocyanate (80:20/2,4:2,6 isomer ratio) | 45.0 |

A cylindrical block was cut from the continuous production line 15 minutes after production was begun. The cylinder had a diameter of approximately 36 inches and was approximately 54 inches long. Immediately after being cut from the production line, an axial hole, having a diameter of about 1¾ inches, was bored in the approximate center of the cylinder. A support rod was inserted into the hole, which was used to support the foam cylinder while being "peeled". Approximately one-half inch of the outside skin or densified polymer layer was peeled to expose an air-permeable surface by rotating the cylinder on the support rod while the outer surface was in contact with a standard peeling knife blade moving transverse to the roll. After peeling, the support rod was removed and a cooling manifold of the general shape shown in FIG. 4, was inserted in its place, sealed end first. The manifold was approximately 50 inches long with a 1¾ inch internal diameter, and contained an array of ¼-inch drilled holes, evenly spaced at 1¼-inch intervals in a spiral fashion along the entire length of the tube, so as to provide a total of about 70 orifices for the passage of coolant fluid. The manifold coupling was connected to a scrubber and then to the intake end of an exhaust fan creating a manifold pressure of about 2 in. H₂O, and drawing 45 SCFM of ambient air through the bun. The temperature of the bun at the initiation of cooling was approximately 275°F and it required about 30 minutes to cool the bun to 75°F ambient temperature. No hot spots were found within the bun after cooling and all of the noxious vapors removed from the block were removed by the scrubber before the air was exhausted to the atmosphere.

The properties of the polyurethane foam from the block were tested immediately after cooling and 24 hours later and the properties were found to be substantially stabilized immediately after cooling, thereby permitting the bun material to be passed to the next procedure immediately without having to anticipate changes in the structural physical properties subsequent to cooling.

EXAMPLE 7

Example 1 was repeated, except that two identical manifolds of the type shown in FIGS. 1 and 2 were employed. The foam bun was laid upon the second manifold instead of upon the wooden tracks, with the other manifold placed on the upper surface as before. Air at a temperature of approximately 10°F was supplied through the duct 7 of the bottom manifold. The initial temperature of the foam block when the vacuum was applied was 250°F, and it was cooled to 75°F in about 4 minutes.

EXAMPLE 8

A foamable polyurethane composition was prepared from a polyether polyol and toluene dissocyanate and water, without additional blowing agent, in the presence of amine and tin catalysts.

A flexible, open-celled foam bun having dimensions of 15 by 15 by 15 inches was prepared from the above formulation by pouring it into a mold measuring approximately 16 inches on each side. The outer densified layer of each surface was sliced off to expose freshly cut porous surfaces. The cooling manifold described in detail in Example 3, of the type shown in FIG. 3, was used to force dry nitrogen at 40 psi and a temperature of approximately 75°F through the bun and out into the atmosphere.

The nitrogen flow was started 30 minutes after the start of production of the foam bun, at which time the bun had a temperature of 265°F. After 15 minutes of cooling, the temperature of the bun was 75°F.

EXAMPLE 9

The polyether urethane foam of Example 3 was repeated in a fresh laboratory batch, using 4 parts of water per hundred parts of polyol and an isocyanate index of 112 to insure a high exotherm. As soon as the fresh foam had cured sufficiently to be cuttable, it was cored vertically in the mold to give two hot, fresh, skin-free cylinders of foam, each about 3 inches long and about 1 inch wide. One such core was allowed to stand in the open, with a thermometer inserted into the core to measure its center temperature. The other core was simultaneously squeezed into a glass cylinder having one closed end, diameter slightly smaller than the foam core, and a height of approximately 6 inches. Before inserting the foam core, just enough powdered dry ice was charged to the cylinder to cover the bottom (approximately 150 percent of the weight of the foam). This foam core, containing a similarly-placed thermometer, was positioned in the cylinder so that it was approximately one-half inch above the level of the coolant. Both foam cores were allowed to stand 10 minutes, by which time the temperature of the glass-enclosed one dropped 11°F, while the other foam core dropped only 2°F. The free foam core was somewhat tacky to the touch, and, when compressed under 10 pounds of pressure for 24 hours, recovered only 80 percent of its original dimension. In contrast, the cooled core was tack-free to the touch, and under the same compression conditions, recovered 91 percent of its original dimensions.

EXAMPLE 10

A wooden box having inside dimensions of 12 × 12 × 12 inches and open on the top and bottom was equipped with two opposing airtight manifolds of the type shown in FIG. 1, each manifold having a single port. One port was connected to the discharge end of a laboratory gas pump, while the port on the opposite face was connected, via a chillable water-trap, to the intake of the pump, thus forming a sealable gas recycle system capable of maintaining essentially no pressure drop, when assembled and run in the absence of foam. When run in the absence of foam, but with the glass water-trap immersed in a liquid nitrogen bath, the air in the box was reduced in temperature about 9°F in the first 10 minutes, and about 27°F in about 30 minutes, while the trap became plugged with condensed water.

A. Laboratory foam freshly made as in Example 1 was quickly trimmed to fit fully and snugly in the box, and the closed assembly was subjected to the recirculation of air dried by passage through the liquid-nitrogen cooled water-trap. The temperature within the foam remained essentially constant for about 6 minutes, but then slowly dropped slightly less than 9°F in the next 13 minutes. At the end of the 24 minute run, the foam temperature had dropped to 4°F less than that of the room (82°F).

B. Example 10A was repeated on freshly made foam, except that water was removed by use of a Drierite trap, rather than by chilling. The run was terminated at the end of 24 minutes, with the foam bun temperature approximately 11°F higher than room temperature (82°F).

C. Example 10A was repeated, but without any moisture knockout, i.e., the closed air-flow system contained no air-drying system. At the end of the 24 minute run, the bun temperature was approximately 9°F higher than that of the room (82°F).

D. A freshly made and trimmed sample of the same foam formulation was allowed to sit in the 12 × 12 × 12 box with the both manifold faces open.

Immediately after each run, the 4 samples were compared for touchtack and compression set. Sample A was free of tack at that time, as were B and C, but Sample D was slightly sticky to the touch. After 24 hours under 25 lbs. pressure at room temperature Sample A recovered 81 percent of its compressed height, Sample B 76 percent, Sample C 74 percent, and Sample D 55 percent.

After an untested piece of each foam has been allowed to sit in the open overnight, Sample A showed no trace of peroxide formation (by KI-acetic test); samples B and C showed a trace when a starch indicator was used to enhance a color formation, and Sample D showed the characteristic iodine reaction even without starch.

EXAMPLE 11

A cylinder of foam, about 3 inches long and 1 inch in diameter, was quickly cut from the plant-made foam of Example 4 and snugly fit its full length into a pre-chilled glass cylinder having one closed end, the bottom third of which contained an equal volume of liquid nitrogen. The liquid nitrogen in the cylinder was allowed to evaporate slowly over 1 hour, during which time the foam, through which the nitrogen gas must pass, dropped in temperature to 51°F. A similar core of the same foam was allowed to stand one hour at room temperature (the control), during which time its temperature dropped to 100°F. The chilled foam, after 24 hours at room temperature, was peroxide-free and showed a tensile strength (single sample) of 15.1 psi, while the untreated control, after 24 hours at room temperature, showed positive to the peroxide test, and a single-sample tensile strength of 13.7 psi.

The following is claimed as the patentable embodiments of the above defined invention:

1. A process for preparing an open, cellular, solid polyurethane mass having more uniform physical properties throughout the cross-section of the mass, which comprises inducing a pressure drop across at least two opposing gas-permeable surfaces of a hot, freshly-polymerized, open-celled, solid polyurethane bun to induce a draft of gas having an initial temperature of about 80°F or lower to pass through the bun between the two surfaces in order to cool the bun rapidly and uniformly.

2. The process of claim 1 wherein the initial temperature of the gas is from about 0° to 80°F.

3. The process of claim 1 wherein the gas is air, nitrogen, carbon dioxide, helium, argon, neon, krypton, xenon or a halogenated hydrocarbon, or a mixture of two or more of the foregoing gases.

4. The process of claim 1 wherein the gas is air.

5. The process of claim 1 wherein an outer densified skin of impermeable polymer is first removed from at least portions of the surface of the bun before inducing the pressure drop across opposing faces of the bun.

6. The process of claim 5 wherein the bun is a rectilinear hexahedron and wherein the densified skin is removed from two opposite faces.

7. The process of claim 1 wherein the bun is cooled to approximately 75°–80°F in a period of not more than about 40 minutes.

8. The process of claim 1 wherein the pressure drop is induced by reducing the pressure above one gas-permeable surface and a second opposing gas-permeable surface is exposed to air at ambient atmospheric pressure.

9. The process of claim 8 wherein a vacuum is induced over at least about 75 percent of one gas-permeable surface.

10. The process of claim 1 wherein the bun is substantially cylindrical and one of the surfaces in an internal surface around the center of the bun.

11. The process of claim 10 wherein the outer skin of the cylindrical bun is removed prior to inducing the pressure drop.

12. The process of claim 10 wherein a manifold is inserted into the bun along the axis of the bun, in order to pass a gas through the bun.

13. The process of claim 12 wherein a vacuum is induced in the manifold so as to cause a gas to pass from the outer surface of the substantially cylindrical bun, through the body of the bun, and out through the manifold.

14. The process of claim 12 wherein a gas under positive pressure is passed into the manifold so as to cause the gas to pass through the internal surface of the bun, through the body of the bun, and out through the outer surface of the bun.

15. The process of claim 1 wherein the pressure drop is induced through a manifold comprising a network of interconnected pipes and a multiplicity of open hollow needles, one end of each of said needles penetrating a surface of the bun.

16. The process of claim 15 wherein a gas under positive pressure is injected through the needles, so as to pass through the body of the bun and out through another surface.

17. A process in accordance with claim 1 wherein the gas passing out through a surface of the bun is scrubbed before being exhausted to the atmosphere.

* * * * *